(12) United States Patent
Kinser et al.

(10) Patent No.: US 8,327,426 B2
(45) Date of Patent: Dec. 4, 2012

(54) SINGLE SIGN ON WITH PROXY SERVICES

(75) Inventors: Stephen Hugh Kinser, Saratoga Springs, UT (US); Lloyd Leon Burch, Payson, UT (US); Cameron Craig Morris, Saratoga Springs, UT (US)

(73) Assignee: Novell Intellectual Property Holdings, Inc., Provo, UT (US)

( * ) Notice: Subject to any disclaimer, the term of this patent is extended or adjusted under 35 U.S.C. 154(b) by 1058 days.

(21) Appl. No.: 11/444,944

(22) Filed: Jun. 1, 2006

(65) Prior Publication Data
US 2007/0294752 A1 Dec. 20, 2007

(51) Int. Cl.
H04L 29/06 (2006.01)
(52) U.S. Cl. ................. 726/8; 726/2; 726/3; 726/12
(58) Field of Classification Search ............... 726/8, 12
See application file for complete search history.

(56) References Cited

U.S. PATENT DOCUMENTS

| | | | |
|---|---|---|---|
| 5,913,025 A | 6/1999 | Higley et al. | |
| 5,991,810 A | 11/1999 | Shapiro et al. | |
| 6,182,141 B1 * | 1/2001 | Blum et al. | 709/227 |
| 6,421,768 B1 * | 7/2002 | Purpura | 711/164 |
| 6,728,885 B1 | 4/2004 | Taylor et al. | |
| 6,892,307 B1 | 5/2005 | Wood et al. | |
| 2004/0128392 A1 * | 7/2004 | Blakley et al. | 709/229 |
| 2005/0015490 A1 * | 1/2005 | Saare et al. | 709/225 |
| 2005/0193427 A1 * | 9/2005 | John | 726/1 |
| 2006/0021010 A1 * | 1/2006 | Atkins et al. | 726/5 |
| 2007/0143836 A1 * | 6/2007 | Bowers et al. | 726/10 |

OTHER PUBLICATIONS

"Federation of Identities in a Web Services World." MSDN. Microsoft Corporation.2003. <http://msdn.microsoft.com/en-us/library/ms951235(printer).aspx>.*
"Brokered Authentication:Security Token Service (STS)." MSDN. Dec. 2005. Microsoft. <http://msdn.microsoft.com/en-us/library/aa480563(printer).aspx>.*
Patterson, Pat, Pirasenna Velandai Thiyagarajan, and Marina Sum,. "Federated Identity: Single Sign-On Among Enterprises." Sun Developer Network Oct. 14, 2004 Web.<http://developers.sun.com/identity/reference/techart/federated.html>.*
"Web Services Federation Language (WSSpecification), Version 1." Jul. 8, 2003. Siddartha Bajaj et al.*
"The Enterprise Single Sign-On Service and associated BizTalk Server 2004 services fail after you install Windows XP Service Pack 2 (SP2)", http://support.microsoft.com/default.aspx?scid=kb;en-us;841893, (2004),1-3.
"Welcome to the Java Open Single Sign-On Project", http://www.josso.org/, (2006),1-5. Cohen, F., "Using Web services for e-Commerce single sign-in", http://www-128.ibm.com/developerworks/webservices/library/ws-single/, (Jan. 1, 2002),1-7.

* cited by examiner

Primary Examiner — Kambiz Zand
Assistant Examiner — Imhotep Durham
(74) Attorney, Agent, or Firm — Schwegman, Lundberg & Woessner, P.A.

(57) ABSTRACT

Techniques for proxing services with a single sign on are provided. A principal authenticates to a first identity service. The first identity service is in a trusted relationship with a second identity service. An authentication request is sent to the second identity service and the request includes an authentication response supplied by the first identity service in response to successful authentication of the principal to the first identity service. In response to the authentication request and the accompanying response, the principal is authenticated for access to the second identity service. Furthermore, targeted services accessible to the second identity service are proxied from and to the principal during interactions between the principal and an external service of that principal.

17 Claims, 4 Drawing Sheets

SINGLE SIGN ON WITH PROXY SERVICES

FIELD

The invention relates generally to security and more particularly to techniques for establishing single sign on with proxy services.

BACKGROUND

Increasingly enterprises and users are conducting their business transactions and their affairs over the Internet. Any given transaction may require multiple parties to successfully complete and may also entail accessing or creating confidential or private data for one or more of the parties involved in the transaction. For example, a user (first party) may purchase a good or service from an enterprise (second party) over the Internet using a World-Wide Web (WWW) browser by supplying the user's credit card number (confidential information acquired from a third party namely the bank of the credit card) to consummate the transaction.

So, when a user is interacting with one secure party, such as a vendor, the same user may desire or need access to another secure party, such as a bank, because the bank can assist the user in completing a pending transaction with the vendor. Often, unless the bank is preconfigured to interact and available to the vendor before the transaction is commenced with the user, the transaction will fail or the attempt to enlist the services of the bank will fail. This is so, because the user may maintain separate accounts with the vendor and with the bank and neither the vendor or the bank are designed to interact with one another, even if each are designed to securely and independently interact with the user. Consequently, the user may be forced to abort the transaction with the vendor in question or the user may be forced to attempt to sign up for another service, which is compatible with the vendor for purposes of completing the pending transaction.

Moreover, even assuming, in the present example, that the bank and vendor are able to interact with one another for purposes of completing the transaction of the user, the user will still likely be forced to separately authenticate to both the bank and also the vendor before the transaction can complete, even though the user may already be authenticated to the vendor for purposes of completing any pending transaction with the vendor.

To compound the incompatibility and inconvenience issues, a user may have to maintain, manage, and recall a variety of identifiers and passwords associated with a variety of Internet services for any given transaction even when each of the services involved in any given transaction may actually securely communicate with one another independent of the user and may actually also securely interact with the user.

Therefore, there is a need for techniques that permit a user to achieve single sign on for any given network transaction, where that transaction includes the proxying of services.

SUMMARY

In various embodiments, techniques for single sign-on with proxy services are presented. More specifically, and in an embodiment, a method for single sign on with proxy services is provided. An authentication request is received from a principal and the principal is authenticated in response to the authentication request. An authentication statement is supplied for use by an identity service on behalf of the principal. The authentication statement serves as a new authentication request and as a new authentication response for single sign-on access of the principal to the identity service. Furthermore, external services are proxied to the identity service in response to the single sign on.

DETAILED DESCRIPTION

Figure 1:
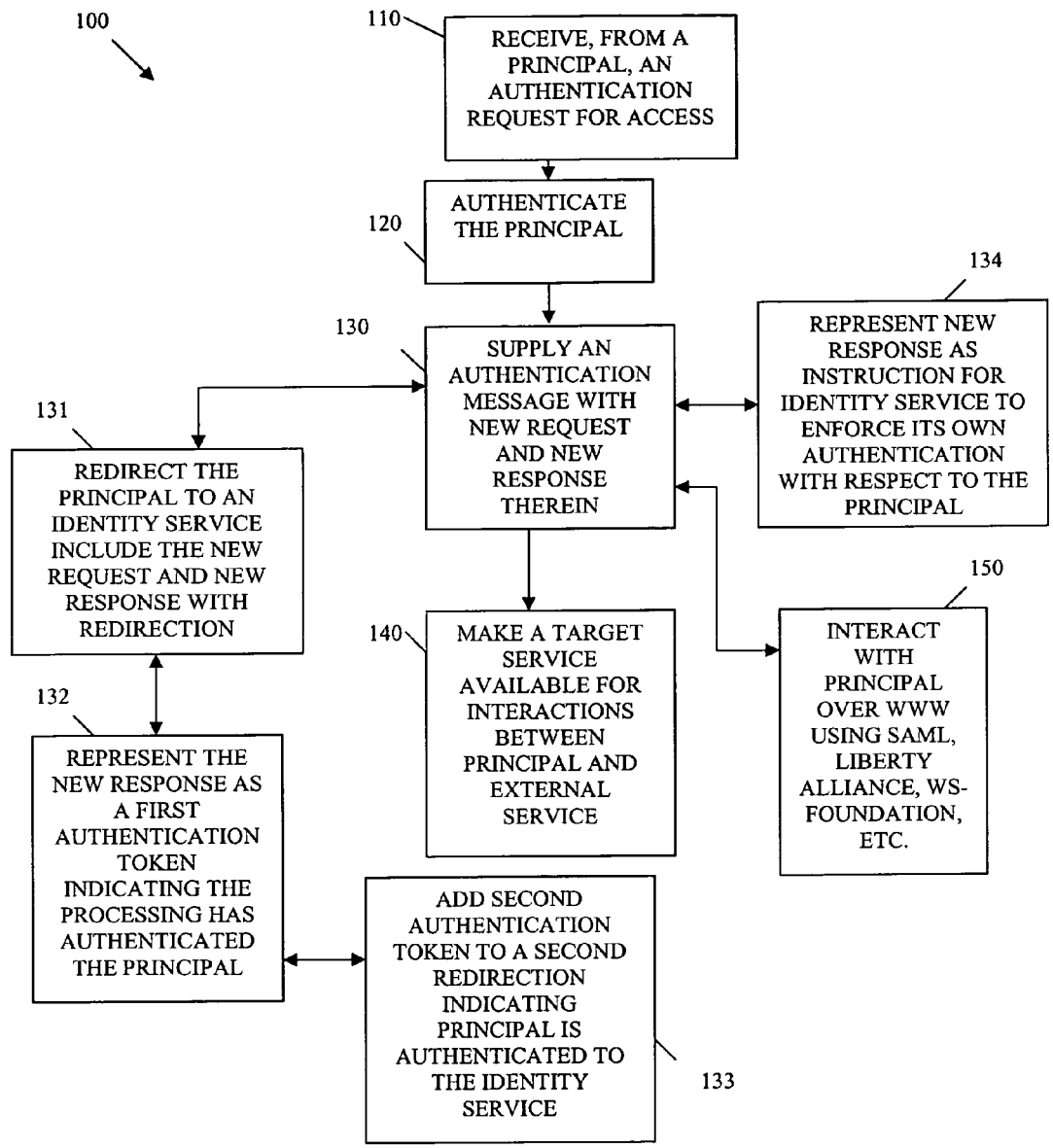
FIG. 1 is a diagram of a method for single sign-on with proxy services, according to an example embodiment.

As used herein a "service" is a type of resource that is accessible over a network. The service is implemented as instructions that when loaded and accessed by a machine performs one or more functions that the service is advertised to perform. For example, an email service provides functions and features associated with sending, receiving, and processing email messages. A "principal" is another type of resource that may be an automated service, or may logically represent a physical resource within an electronic environment, such as, but not limited to, a user, a device, a group of users, a group of devices, an object, etc.

An "identity service" refers to a special type of service that is designed to manage and supply authentication services and authentication information for principals and for other services. So, an identity service may authenticate a given principal for access to a variety of local and external services being managed by that identity service. A single principal may have multiple identity services.

In some cases, an identity service may manage its own services. As used herein "target or targeted services" are one or more services that are accessible to and perhaps controlled by an identity service. These targeted services are proxied from a particular identity service to an external service associated with a principal or to another identity service directly accessible to the external service.

According to an embodiment, the identity services presented herein are enhanced and modified versions of the identity services described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

Furthermore, the use of the phrases "authentication token" and "authentication statement" may be used interchangeably herein. An authentication token or statement is a special string of characters, which identifies an authentication event. The authentication token or statement may also indicate the resource or principal that performed the authentication and other metadata. In some embodiments, the authentication statement may be represented as a Security Assertion Markup Language (SAML) assertion, a Liberty Alliance assertion, or any other assertion or protocol, such as, but not limited to Web Services (WS) Foundation markup language, etc. An "authentication message" is a message that includes both an authentication statement/token and an authentication request. The authentication message is discussed in greater detail below.

Principals interact with identity services and other services using a variety of existing or modified Application Programming Interfaces (API's) or existing and modified World-Wide Web (WWW) browser interfaces. So, according to an embodiment, a principal may utilize a Mozilla Firefox® browser and hypertext markup language (HTML) interface to interact with one or more identity services to conduct transactions over the Internet. The techniques in which the principals and the identity services interact through these interfaces are described more completely herein and below. As will be demonstrated, these techniques permit any given principal to achieve a single sign on to a plurality of identity services and have access to proxied services from some of those identity services.

Various embodiments of this invention can be implemented in existing network architectures. For example, in some embodiments, the techniques presented herein are implemented in whole or in part in the Novell® network and proxy server products, email products, identity service products, operating system products, and/or directory services products distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

FIG. 1 is a diagram of a method 100 for single sign-on with proxy services, according to an example embodiment. The method 100 (hereinafter "single sign-on service") is implemented in a machine-accessible and readable medium. The single sign-on service is operational over and processes within a network. The network may be wired, wireless, or a combination of wired and wireless.

According to an embodiment, the single sign-on service represents the processing associated with an initial identity service that any given principal interacts with for purposes of achieving a single sign-on and to acquire proxy services. The processing associated with a secondary identity service for which a single sign-on is achieved with, via the single sign-on service, is described below with respect to the method 200 of the FIG. 2. Furthermore, the processing associated with a service proxied from the secondary or second identity service to an external service that the principal directly interacts with is described below with respect to the method 300 of the FIG. 3.

Initially, one or more identity services, such as enhanced versions of identity services disclosed and incorporated by reference above, include a variety of services that they perform authentication for to ensure legitimate access to those services. The identity services may control access to services that are local to them or that are external to them. Moreover, the identity services are trusted with one another and communicate securely with on another.

A principal engages in a transaction or communication with external services controlled by or accessible to a first identity service (referred to as the "single sign-on service" represented by the method 100 and the FIG. 1). In some cases, the principal initially logs into its network service provider via the single sign-on service and the transaction that the principal is engaged in utilizes other identity services or services that may or may not be associated with the initial single sign-on service (first identity service).

With this context, the processing of the single sign-on service is now described in greater detail with reference to FIG. 1. Accordingly, at 110, the single sign-on service receives, from a principal, an authentication request for access. Again, this may be a sign-on request for access to the network or to a site or to any service. The presence of the single sign-on service may be transparent or unknown to the principal. That is, the principal may believe that it is interacting or attempting to interact with an external service and the single sign-on service intercepts the communication and attempts to authenticate the principal in the manners described herein and below.

At 120, the single sign-on service authenticates the principal. The technique used for authentication can vary and can be automatically driven by policy. For example, an identifier and password communication may be used, a certificate may be used, biometrics may be used, or any challenge and response type dialogue may be used until the sign-on service is satisfied that the principal is who it purports to be. After this is done, the single sign-on service has successfully authenticated the principal. At this point, the processing of the single sign-on service facilitates principal access to a variety of additional identity services and other services accessible to the single sign-on service in an automated fashion that may be transparent and seamless from the perspective of the principal.

Correspondingly, at 130, and after the principal is authenticated to the single sign-on service for access, the single sign-on service supplies an authentication message to the principal for the principal or automated services of the principal to use. The authentication message includes an authentication request and an authentication response to satisfy that authentication request. That is, the authentication message is an authentication request made on behalf of the principal and targeted to another identity service (second or secondary identity service) and its accessible services (target or targeted services). The authentication request is also accompanied with an authentication response, within the authentication message, that responds to the request being made. So, the single sign-on service formulates a valid authentication request for the principal that is targeted to an identity service, trusted by the single sign-on service, and includes with that request a response made on behalf of the principal. This permits the principal to, in some cases, be automatically authenticated to the identity service.

According to an embodiment, at 131, the single sign-on service may facilitate the authentication of the principal to another identity service in response to successfully authenticating the principal using WWW browser interactions and interfaces. So, after the principal is authenticated, at 120, to the single sign-on service, the single sign-on service forces a redirection of the principal's browser, at 131, that directs the principal, via its browser, to the second or secondary identity service. That redirection includes the new authentication request made on behalf of the principal and a new authentication response, which was formulated by the single sign-on service. In some cases, at 132, the new authentication response is represented as a first authentication token, which indicates to the secondary identity service that the principal has already been and currently is authenticated for access to the single sign-on service and its available services (targeted services). The combined new authentication request and new authentication response may be viewed as an authentication message supplied by the single sign-on service to the principal and perhaps unbeknownst to the principal. So, in some cases the single sign-on service may be implemented as or using a transparent proxy.

The targeted or secondary identity service, in response to the authentication response, may assume that the principal is to be automatically presumed authenticated for access to the targeted identity service. This presumption can occur because the single sign-on service is trusted with and by the targeted identity service and if the single sign-on service vouches for the principal and indicates via an authentication message or via the authentication response that the principal is authenticated then the targeted identity service can assume or presume the principal to be authenticated to the targeted identity service.

In some embodiments, at 133, once the targeted identity service presumes or authenticates the principal, in response to the presence of the authentication response supplied by the single sign-on service, the principal may receive a second authentication token from the targeted identity service that indicates the principal is also now authenticated to the targeted identity service. Thus, at this point the principal has signed on once to the single sign-on service and is in possession of two authentication tokens indicating that the principal has access to the single sign-on service and to the targeted or secondary identity service.

According to an embodiment, at 134, the single sign-on service may desire that additional security precautions be used for the single sign-on process. Thus, the new authentication response may represent an instruction to the targeted identity service that instructs the targeted identity service to independently authenticate the principal via its own challenge and response dialogue with the principal. So, the single sign-on process may actually entail two interactions with the principal in some embodiments, one with the single sign-on service and one with the targeted identity service. However, the determination as to whether to use a single interaction or multiple interactions is automatically communicated via the new authentication response formulated by the single sign-on service on behalf of the principal. Moreover, the determination can be automatically driven by policy that the single sign-on service evaluates with respect to the principal and/or with respect to the targeted identity service.

In some cases, at 140, the single sign-on service may have initially accessed a variety of external services via the sign-on service or may have initially accessed the variety of external services directly and these services contacted and engaged the single sign-on service and its processing. Now suppose that the secondary or targeted identity service includes a target service that the principal may desire or have a need for during interactions with a particular external service. That target service can be proxied directly to the external service through use of the second authentication token in possession of the principal, which was automatically acquired from the single sign-on service. The proxy can be achieved via the single sign-on service or in some cases the single sign-on service may be bypassed. Presentation by the principal or by its external service of the second authentication token permits the target or secondary identity service to expose and make available a desired remote target service. The target service is accessible from the environment of the external service of the principal even though it is natively present in an environment associated with the target identity service and the target identity service. One technique for doing this is for the external service to present the first and second authentication tokens to the single sign-on service along with a request for the target service associated with the secondary or target identity service. The single sign-on service may act as a proxy for a session between the target service and the external service of the principal or it may facilitate a session directly between the external service and the target service.

This permits a principal to sign in once to the single sign-on service (directly or indirectly through an initial external service of the principal) and conduct business with the target identity service and/or its managed targeted services and during any given transaction with an external service of the principal in an automated manner without interrupting the transaction. This is more convenient and more seamless from the perspective of the principal. Essentially, a single sign on is used to acquire proxied access to targeted services and to gain access to a plethora of additional identity services and their additional targeted services.

At 150, the interactions between the principal may occur via the WWW over the Internet using a browser interface and the authentication statement (request and response) may be formulated using SAML, Liberty Alliance, WS-Foundation protocols, etc.

It is now appreciated how a principal (automated service or logical representation of a resource, such as user, group, device, etc.) can achieve a single sign-on for a transaction over a network via a known or unknown (intercepted) communication with a single sign-on service and have a variety of targeted services available from a variety of additional targeted identity services or even proxied services via the single sign-on service. This increases the ease of transacting securely over the Internet and makes transactions progress in a seamless and automated fashion even when a variety of different services are used for those transactions.

Figure 2:
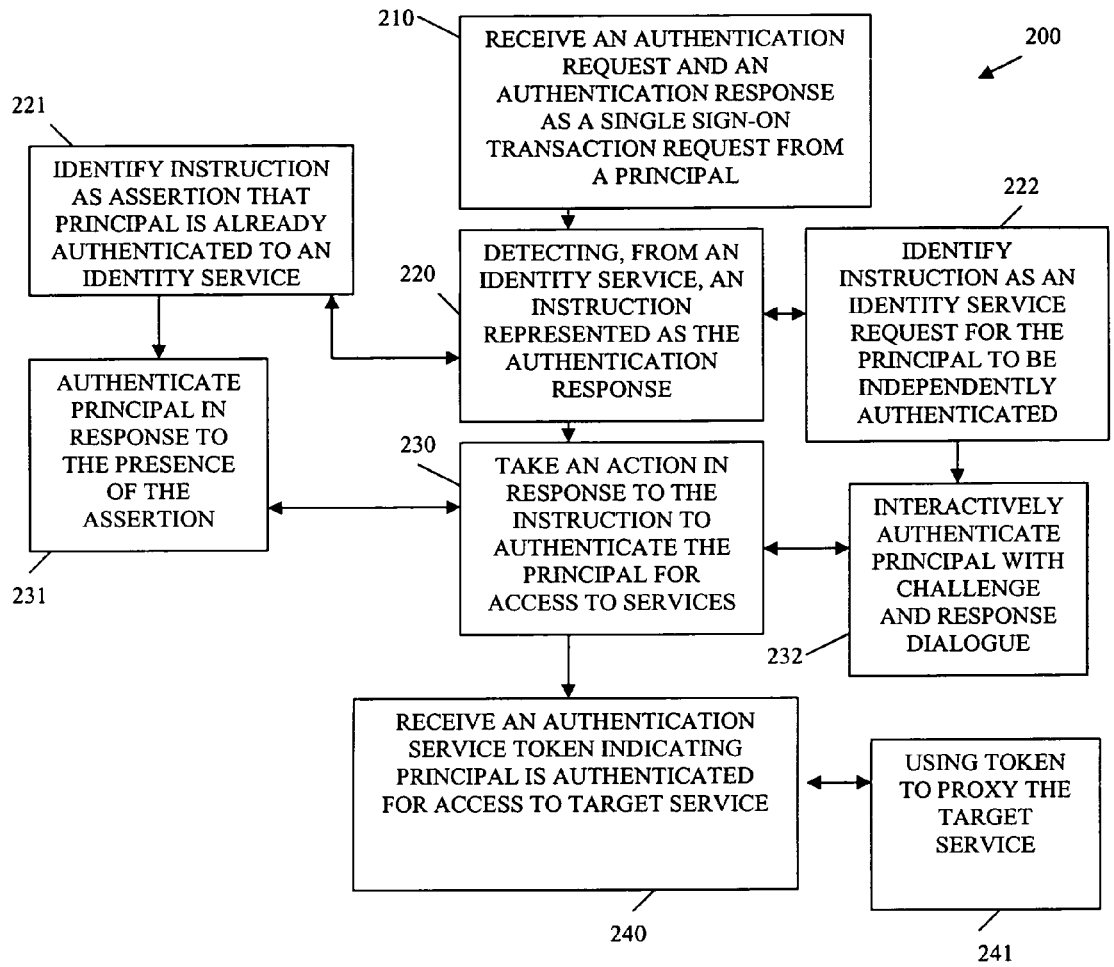
FIG. 2 is a diagram of another method for single sign-on with proxy services according to an example embodiment.

FIG. 2 is a diagram of another method 200 for single sign-on with proxy services according to an example embodiment. The method 200 (hereinafter "secondary identity service" (also referenced as target identity service above with respect to the sign-on service of the method 100 of the FIG. 1) is implemented in a machine-accessible and readable medium and is operational over a network. The network may be wired, wireless, or a combination of wired and wireless.

In an embodiment, the secondary identity service depicts processing of a second or target identity service that is automatically or indirectly contacted by a principal after an initial attempt for sign on occurs with a first identity service, such as the single sign-on service represented by the method 100 of the FIG. 1.

At 210, the secondary identity service receives an authentication request and an authentication response as a single sign-on transaction from a principal. The authentication request is formulated and provided by an initial identity service on behalf of the principal, such as the single sign-on service represented by the method 100 and discussed above with respect to the FIG. 1. So, initially, the principal had contacted the initial identity service either directly or indirectly (intercepted request with initial access occurring with some other external service of the principal) and that initial identity service formulated the authentication message on behalf of the principal and included therein an authentication request and an authentication response.

At 220, the secondary identity service detects from the authentication response an instruction from the initial identity service that is responsible for constructing the authentication request.

According to an embodiment, at 221, the secondary identity service may identify the instruction as an assertion that the principal is already authenticated to the initial identity service. In some other cases, at 222, the secondary identity service may identity the instruction as an identity service request for the principal to be independently authenticated by the secondary identity service, such as through an existing policy of the secondary identity service or via any desired challenge and response dialogue between the principal and the secondary identity service.

At 230, the secondary identity service takes some action in response to the instruction that is represented in the authentication response for purposes of satisfying itself that the principal is to be authenticated for access to the secondary identity service and its managed, controlled, secondary, or targeted services. Actions taken may be driven by policy, which is evaluated by the secondary identity service in a dynamic and real-time fashion.

So, at 231, if the instruction was an assertion from the initial identity service that the principal is to be authenticated in response to the initial identity service's authentication of the principal, then the secondary identity service assumes or authenticates the principal merely on the presence of such an assertion from the initial identity service.

Conversely, at 232, if the instruction from the initial identity service requested an independent authentication of the principal, then the secondary identity service may interactively and independently authenticate the principal with a challenge and response dialogue or any other technique that is driven by policy.

Once the secondary identity service is satisfied that the principal is properly authenticated it supplies an secondary authentication service token back to the principal, which the principal may subsequently use to acquire proxied targeted services of the secondary identity service.

Accordingly, in an embodiment, at 240, the secondary identity service may also subsequently receive (subsequent to authenticating the principal for access to the secondary identity service) a request for access to one of the targeted or secondary services of the secondary identity service's, The request is also accompanied by the previously issued secondary authentication service token indicating that the principal is authenticated to access a particular targeted service associated with and accessible to the secondary identity service. At 241, the secondary identity service may use this token to give access to the target service. That access can be made in a direct fashion from an external service with which the principal is interacting or made in a direct fashion from the initial identity service with which the principal is indirectly interacting with via its external service. That target service may then be available for transactions for the principal to consume or from the external service of the principal to consume during interactions with the principal. The target service was not initially available to the external service of the principal; it was proxied from the secondary identity service or even via the initial identity service (acting as a conduit) from an environment of the secondary identity service to the principal and its external service with which the principal is interacting.

Figure 3:
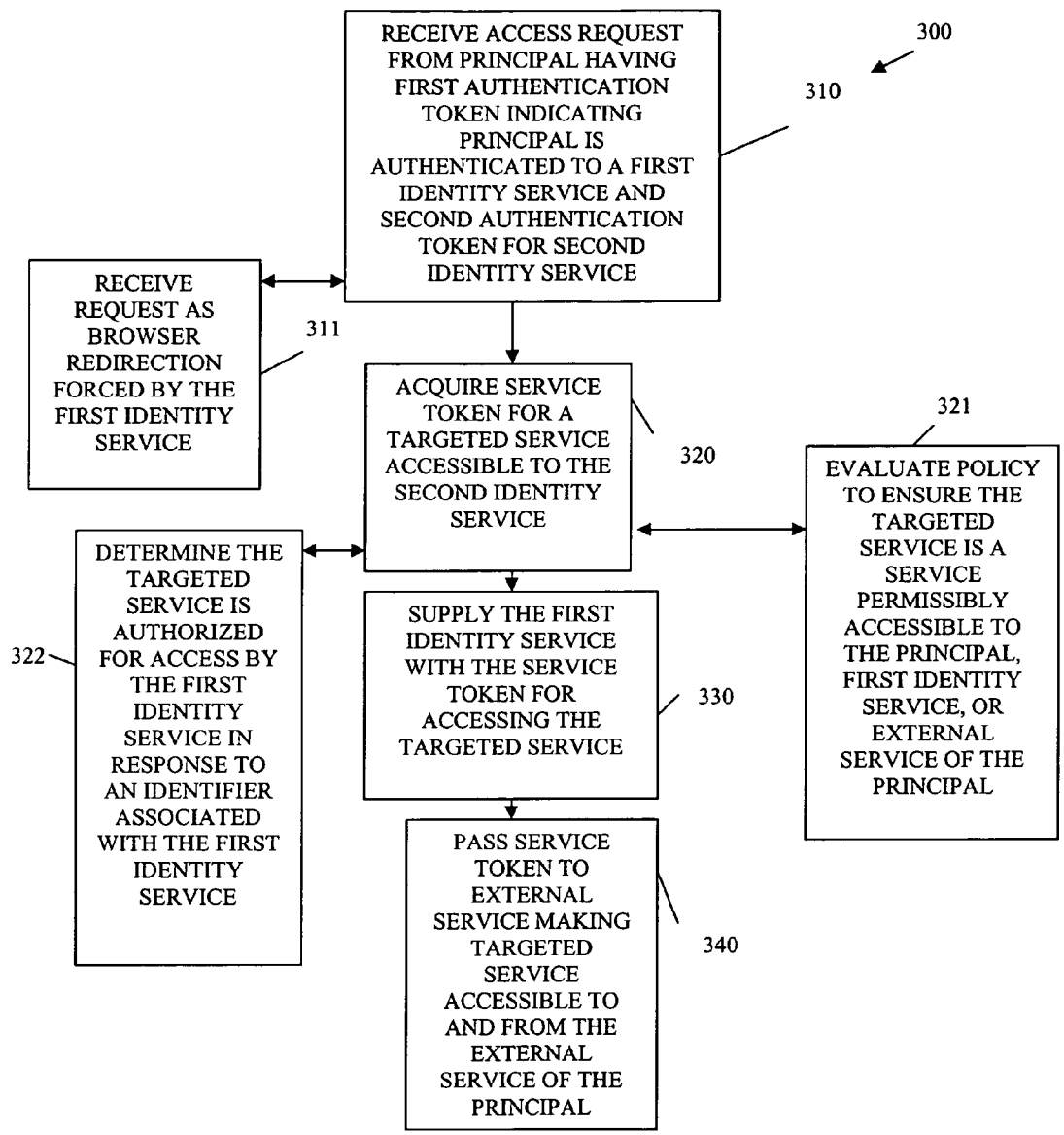
FIG. 3 is a diagram of a yet another method for single sign-on with proxy services, according to an example embodiment.

FIG. 3 is a diagram of a yet another method 300 for single sign-on with proxy services, according to an example embodiment. The method 300 (hereinafter "proxied service") is implemented in a machine-accessible and readable medium and is accessible over a network. The network may be wired, wireless, or a combination of wired and wireless.

According to an embodiment, the proxied service represents processing associated with a service controlled by or accessible to a secondary or target identity service, such as the secondary identity service represented by the method 200 of the FIG. 2. Moreover, the proxied service represents processing that permits a targeted service associated with the proxied service to be proxied from a secondary identity service, such as the secondary identity service represented by the method 200 of the FIG. 2. The targeted service is accessible to both a principal and an external service, associated with the principal, from an environment of the external service even though it is originally just accessible from an environment associated with the secondary identity service.

The proxied service may be implemented as a wrapper to the targeted service that is being proxied from the second or secondary identity service. In some cases, the wrapper may be subsumed as processing within the secondary identity service itself. The proxied service supplies access to the target or targeted service when presented with a service token and the service token is supplied when proper authentication is established.

At 310, the proxied service receives an access request from a principal. The access request includes a first authentication token indicating that the principal has achieved single sign-on access to a first identity service. It is noted that, at 311, this request may be forced by the first identity service on behalf of the principal, such as through browser redirection and that the principal may not actually be aware that the request is being made on its behalf to the proxied service. It is also noted that access request includes a second authentication token indicating that the principal has also achieved authentication and sign-on status with a second or secondary identity service.

At 320, the proxied service may acquire a service token for a targeted service for which it controls, manages, or for which it can grant access. At 321, this acquisition or interaction may be dynamically evaluated using policy to ensure that the targeted service is a type of service that is permissibly accessible to the principal, the external service associated with the principal, and the first identity service. Alternatively, policy may permit the targeted service to be accessible to just the first identity service and to anyone (any entity) that the first identity service designates, where the designation is embodied with the second authentication token. So, the first identity service may make a service that is not usually accessible to the principal available for a given single sign-on transaction and may indicate as much to the proxied service via the second authentication token presented to the secondary or second identity service.

In some cases, at 322, the proxied service may determine that the targeted service is authorized to be accessed by the first identity service, the external service of the principal, and the principal in response to an identifier associated with the first identity service. That identifier may be included with the service token or with the authentication tokens and evaluated against policy by the proxied service.

At 330, the proxied service supplies the first identity service or external service with a service token for accessing the targeted service. This service token permits the first identity service or external service to access the targeted service for transactions. At 340, the first identity service passes the service token along to the external service associated with the principal. The external service can, as desired, pass the service token and instructions to the targeted service through the first identity service for purposes of proxing the features, functions, and data of the registered external service to an environment of the external service. Thus, the target service becomes accessible from and to the external service. It can be accessed by the principal or by the external service as needed during transactions with the principal. Accordingly, the proxied service facilitates the proxing of the targeted service by passing authorization or a service token to the first identity service and the first identity service either passes that to the external service or uses it when the external service requests access to the targeted service associated with the secondary or second identity service.

Figure 4:
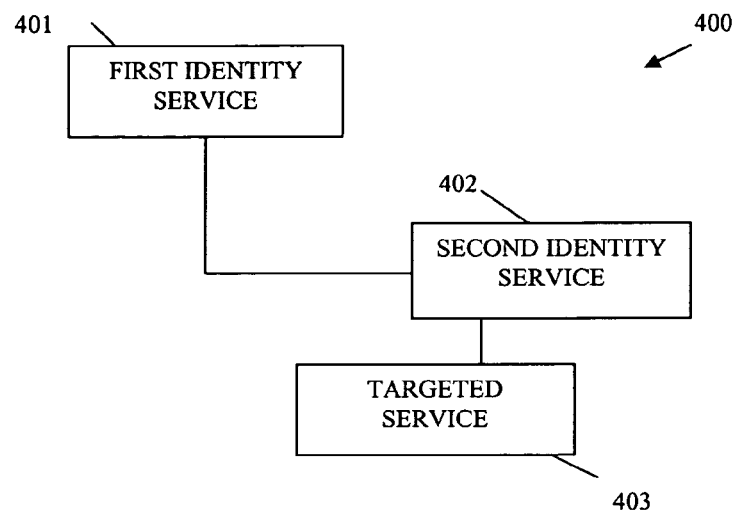
FIG. 4 is a diagram of single sign-on and proxy system, according to an example embodiment.

FIG. 4 is a diagram of single sign-on and proxy system 400, according to an example embodiment. The single sign-on and proxy system 400 is implemented in a machine-accessible and readable medium and is accessible over a network. The network may be wired, wireless, or a combination of wired and wireless. The processing of the single sign-on and proxy system 400 implements, among other things, the processing of methods 100, 200, and/or 300 depicted in the FIGS. 1-3, respectively.

The single sign-on and proxy system 400 includes a first identity service 401 and a second identity service 402. In some embodiments, the single sign-on and proxy system 400 also includes a targeted service 403 proxied from the second identity service 402 and perhaps through the first identity service 401 or through an external service (not shown in FIG. 4) with which a principal interacts. Each of these will now be discussed in turn.

Example interactions and processing for the first identity service 401 were presented above in detail with respect to the single sign-on service represented by the method 100 and the FIG. 1. The first identity service 401 is a service that initially interacts with a principal for purposes of facilitating a single sign on to both an environment and services associated with the first identity service 401 and an environment and targeted services associated with the second identity service 402.

One technique for achieving the single sign-on process is for the first identity service 401 to independently authenticate the principal during an initial interaction with the principal. The first identity service 401 then supplies an authentication message on behalf of the principal to be authenticated to the second identity service 402. The authenticated message includes an authentication request and an authentication response formulated by the first identity service 401. The authentication response is a statement, instruction, and/or assertion from the first identity service 401 that either instructs the second identity service 402 to rely on the first identity service's authentication of the principal for purposes of the second identity service's authentication or instructs the second identity service 402 to independently perform its own authentication mechanism to authenticate the principal.

The first identity service 401 may also be used in the manners described below to proxy targeted services of the second identity service 402 to external services associated with the principal.

Examples of processing associated with the second identity service 402 were presented above in detail with respect to the secondary identity service represented by the method 200 of the FIG. 2. The second identity service 402 receives authentication requests from the principal that were formulated by the first identity service 401. These requests include messages (requests and responses) from the first identity service 401, which instruct the second identity service 402 to rely on prior authentication of the principal or to perform its own independent authentication of the principal. The second identity service 402 may also have a targeted service 403 that it proxies to the first identity service 401 for interactions with the principal or that it proxies to an external service associated with the principal.

Examples of interactions for the targeted service 403 were presented in detail above with respect to the proxied service represented by the method 300 of the FIG. 3. The targeted service 403 is a service that is accessible to the first identity service 401 or external service of a principal and it is also a service for which the first identity service 401 is authorized to interact with and access. In response to a single sign-on transaction with the principal, the first identity service 401 causes the second identity service 402 to present a service token for access to the targeted service 403. The first identity service 401 either manages this itself or supplies it to an external service associated with the principal. In either case, the result is that the principal gains proxied access to the targeted service 403 via the first identity service 401 and during interactions with the principal.

Figure 5:
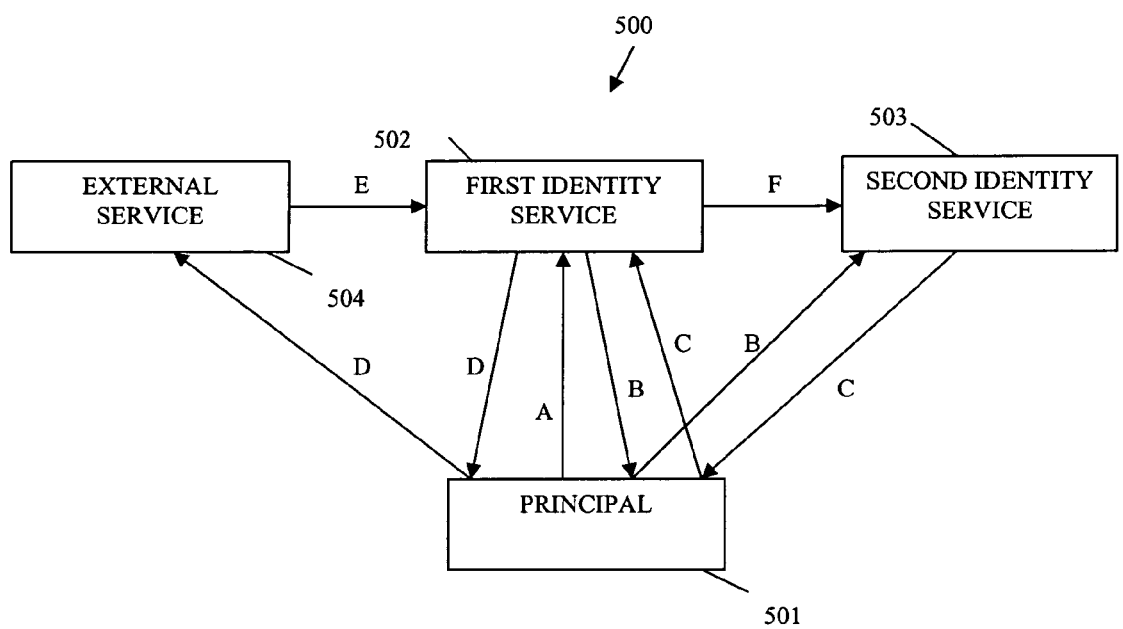
FIG. 5 is a diagram of example interactions among resources that perform the techniques of single sign on with proxy services, according to an example embodiment.

FIG. 5 is a diagram of example interactions among resources that perform the techniques of single sign on with proxy services, according to an example embodiment. FIG. 5 is presented for purposes of illustration only and is not intended to limit the invention to any specific embodiment.

FIG. 5 identifies 4 resources, namely a principal 501, a first identity service 502, a second identity service 503, and an external service 504 initially accessible to the first identity service 502 and the principal 501. The interactions among these resources 501-504 will now be discussed in turn.

Initially, the principal 501 makes an authentication request to the access the first identity service 502 via A. It may also be that A is preceded by interactions between the principal 501 and the external service 504. That is, the principal 501 may initially desire interaction with the external service 504 and is forced via some prior redirection (not shown in FIG. 5) into a login scenario with the first identity service 502 (single sign-on service represented by the method 100 of the FIG. 1).

In an example embodiment, these interactions occur via a WWW browser interface. The processing associated with the first identity service 502 was described in detail above with respect to the method 100 and the FIG. 1. The first identity service 502 authenticates the principal 501, perhaps through an interactive challenge and response dialogue with the principal 501, and automatically redirects the browser of the principal 501 to the second identity service 503 via B.

The second identity service 503 receives an authentication request formulated by the first identity service 502 on behalf of the principal 501. That authentication request also includes a response from the first identity service 502 for the principal 501. The response is an authentication token or statement from the first identity service 502 indicating that the principal 501 is currently already authenticated to the first identity service 502. In response to this, the second identity service 503 considers the principal 501 to be authenticated with the second identity service 503. This can be done via policy and via a pre-existing trusted relationship that exists between the first identity service 502 and the second identity service 503. In response to the automatic authentication of the principal 501 to the second identity service 503, the second identity service 503 supplies a new authentication token to the principal 501 and redirects the browser of the principal 501 back to the first identity service 502 via C.

It is noted that other variations may exist on the process, such that the first identity service 502 may inform the second identity service 503 via the authentication response included in redirection B that the second identity service 503 should perform its own independent authentication or challenge response dialogue with the principal 501. This may be done for a variety of reasons to increase security; but it is noted that it does not have to occur in every situation.

When the first identity service 502 receives the redirection via C of the principal 501, the first identity service 502 attaches its authentication statement or token to another redirection of principal's browser at D to an external service 504.

At this point, the external service 504 is in possession of two authentication tokens associated with the principal 501 with which it is interacting. Suppose now that the principal or the external service 504 during their interactions requires access to a targeted service associated with the second identity service 503. In such a situation, the external service 504 makes a request for the targeted service via E to the first identity service 502. The first identity service 502 presents the proper authentication tokens on behalf of the principal 501 to the second identity service 503 via F and in response the second identity service 503 supplies a service token for the external service 504 or the principal 501 to subsequently gain proxied access to the targeted service from the second identity service 503. Access can occur via the first identity service 502 or it can occur directly via the external service 504 interacting with the second identity service 503.

In this manner, secure transactions remain secure but can occur in a more seamless manner from the perspective of the parties involved. This is done, by the parties sharing authentication and security and proxing services with a single sign-on by any given principal involved in a transaction.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method to execute on a machine, comprising:
   receiving, by the machine, an authentication request from a principal, the request directed by the principal to an external service and intercepted by the method for receipt;
   authenticating, by the machine, the principal; and
   supplying, by the machine, an authentication message for use by an identity service on behalf of the principal, the authentication message serves as a new authentication request and as a new authentication response for single sign-on access of the principal to the identity service and other services external or internal to the identity service, the identity service acts as a proxy for access sessions to the other services on behalf of the principal, the principal's access sessions occur indirectly through the identity service and transparently to the principal, wherein the authentication message includes the new authentication request made on behalf of the principal and the authentication message also includes a new authentication response that satisfies the new authentication request, that response vouches for authentication of the principal to the identity service for the single sign-on access of the principal, the principal believing interactions are with the external service, which is one of the other services that the identity service controls access to, and a determination as to whether to use a single interaction or multiple interactions for authentication of the principal to the other services is automatically communicated in the new authentication response.

2. The method of claim 1 further comprising, making, by the machine, a target service available to interactions between the principal and an external service, the target service is directly accessible from an environment of the identity service.

3. The method of claim 1, wherein supplying further includes redirecting the principal to the identity service and including with the redirection the new authentication request and the new authentication response represented by the authentication message, and the identity service authenticates the principal automatically in response to the new authentication response included with the authentication message.

4. The method of claim 3, wherein supplying further includes representing the new authentication response as a first authentication token that informs the identity service that the principal is currently already properly authenticated to the processing associated with the method.

5. The method of claim 4, wherein supplying further includes adding a second authentication to a second redirection of the principal, wherein the second authentication represents authentication of the principal to the identity service and wherein the second redirection directs the principal to request a target service that is to be proxied on behalf of the principal from the identity service.

6. The method of claim 1, wherein supplying further includes representing the new authentication response as an instruction to the identity service to enforce its own independent authentication with the principal before considering the principal authenticated to the identity service.

7. The method of claim 1 further comprising, interacting, by the machine, with the principal via a World-Wide Web (WWW) browser over the Internet using at least one of a Security Assertion Markup Language (SAML), a Liberty Alliance markup language, and Web Services (WS) Foundation markup language.

8. A machine-implemented method to execute on a machine, comprising:
   receiving, by the machine, an authentication request and an authentication response as a single sign-on transaction from a principal, the authentication request and the authentication response are received indirectly from the principal via an original identity service acting as a proxy on behalf of the principal and actions of that original identity service are transparent to the principal and the authentication response produced by that original identity service to authenticate the principal for the single sign-on transaction, the authentication request and the authentication response produced by the original identity service are different from that which was originally provided by the principal to the original identity service and the authentication request and the authentication response are made on behalf of the principal once the principal is authenticated by the original identity service;
   detecting, by a machine and from an identity service, an instruction, which is represented in the authentication response, the identity service is different from the original identity service, and the identity service and the original identity service are in a secure relationship with one another; and
   taking, by the machine, an action in response to the instruction to authenticate the principal for access to targeted services, access to the target services occur via proxied sessions through the identity service and transparent to the principal, wherein the action taken is dynamic and a real-time evaluation of policies processed by the identity service.

9. The method of claim 8, wherein detecting further includes identifying the instruction as an assertion from the identity service that the principal is currently already authenticated to the identity service.

10. The method of claim 9, wherein taking further includes authenticating the principal, in response to the assertion, and supplying an authentication token to the principal indicating that the principal is authenticated for access to the targeted services.

11. The method of claim 8, wherein detecting further includes identifying the instruction as an identity service request from the identity service to independently authenticate the principal.

12. The method of claim 11, wherein taking further includes interactively authenticating the principal via a challenge and response dialogue in response to the identity service request and supplying an authentication token to the principal that indicates the principal is authenticated for access to the targeted services, if authentication is successful.

13. The method of claim 8 further comprising:
receiving, by the machine, an authentication service token from the identity service or an external service associated with the principal, the authentication service token indicates the principal has been authenticated for access to the targeted services, and the targeted services are external to the identity service; and
using, by the machine, the authentication service token to proxy the targeted services to the identity service or the external service associated with the principal transparent to the principal, access sessions between the principal and the target services are proxied via the identity service or the external service.

14. A machine-implemented method to execute on a machine, comprising:
receiving, by the machine, a request for access from a principal, the request includes a first authentication token, the first authentication token indicating the principal is currently already authenticated to a first identity service and a second authentication token indicating the principal is also currently also already authenticated to a second identity service, the principal authenticates to the second identity service via the first authentication token because the first identity service is in a secure relationship with the second identity service and the second identity service relies on the first authentication token to automatically issue the second authentication token, and the second authentication token identifies the principal indicating that the first identity service can permissibly designate the principal for access to a targeted service controlled by the second identity service;
acquiring, by the machine, a service token for the targeted service that can be made accessible to the first identity service; and
supplying, by the machine, the first identity service with the service token for accessing the targeted service, the first identity service passes the service token to the principal thereby making the targeted service accessible from and to the principal from the first identity service acting as a proxy for features of the target service and using the service token, the first identity service proxies the target service to the principal while the principal believes that the principal is directly interacting with the target service, the target service was originally just accessible from an environment associated with the second identity service but is made available outside that environment by the second identity service providing proxy services to the first identity service and the first identity service provides to the principal.

15. The method of claim 14, wherein receiving further includes receiving the request as a browser redirection forced by the first identity service during interactions with the principal, and wherein the first authentication token is automatically supplied in the request during the redirection.

16. The method of claim 14, wherein acquiring further includes evaluating policy to ensure the targeted service is a type of service, which is permissibly accessible to the principal.

17. The method of claim 14, wherein acquiring further includes determining that the targeted service is authorized for access by the first identity service in response to an identifier associated with the first identity service.

* * * * *

UNITED STATES PATENT AND TRADEMARK OFFICE
CERTIFICATE OF CORRECTION

PATENT NO. : 8,327,426 B2
APPLICATION NO. : 11/444944
DATED : December 4, 2012
INVENTOR(S) : Kinser et al.

It is certified that error appears in the above-identified patent and that said Letters Patent is hereby corrected as shown below:

On the face page, in column 2, under "Other Publications", line 1-2, delete "World." MSDN. Microsoft Corporation.2003. <http://" and insert --World", MSDN, Microsoft Corporation, 2003, <http://--, therefor On the face page, in column 2, under "Other Publications", line 4-5, delete "(STS)." MSDN. Dec. 2005. Microsoft." and insert --(STS)", MSDN, Microsoft Corporation, Dec. 2005,--, therefor On the face page, in column 2, under "Other Publications", line 7, delete "Sum,." and insert --Sum,--, therefor On the face page, in column 2, under "Other Publications", line 8-9, delete "Enterprises." Sun Developer Network Oct. 14, 2004 Web. <http://" and insert --Enterprises", Sun Developer Network, Oct. 14, 2004, Web:<http://--, therefor On the face page, in column 2, under "Other Publications", line 11-12, delete ""Web Services Federation Language (WSSpecification), Version 1." Jul. 8, 2003. Siddartha Bajaj et al.*" and insert --Siddartha Bajaj et al., "Web Services Federation Language (WSSpecification), Version 1," Jul. 8, 2003. *--, therefor On the face page, in column 2, under "Other Publications", line 16, delete "(2004),1-3." and insert --(2004), 1-3.--, therefor On the face page, in column 2, under "Other Publications", line 18, delete "(2006),1-5." and insert --(2006), 1-5.--, therefor On the face page, in column 2, under "Other Publications", line 18, before "Cohen, F.,", insert --¶--, therefor Signed and Sealed this
Twelfth Day of February, 2013

Teresa Stanek Rea
*Acting Director of the United States Patent and Trademark Office*

CERTIFICATE OF CORRECTION (continued)
U.S. Pat. No. 8,327,426 B2

On the face page, in column 2, under "Other Publications", line 20, delete "(Jan. 1, 2002),1-7." and insert --(Jan. 1, 2002), 1-7.--, therefor